(12) United States Patent
Lambert et al.

(10) Patent No.: US 8,557,052 B2
(45) Date of Patent: Oct. 15, 2013

(54) METHOD AND APPARATUS FOR STRIPPING OPTICAL FIBERS AND OPTICAL FIBER ASSEMBLIES

(75) Inventors: Christopher H. Lambert, Christiansburg, VA (US); Robert M. Harman, Troutville, VA (US); Daniel S. Homa, Blacksburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 197 days.

(21) Appl. No.: 13/197,373

(22) Filed: Aug. 3, 2011

(65) Prior Publication Data

US 2013/0032177 A1    Feb. 7, 2013

(51) Int. Cl.
*B08B 7/00* (2006.01)

(52) U.S. Cl.
USPC ............................................. 134/42; 156/711

(58) Field of Classification Search
None
See application file for complete search history.

(56) References Cited

U.S. PATENT DOCUMENTS

| | | | | |
|---|---|---|---|---|
| 5,968,283 | A * | 10/1999 | Walraven et al. | 134/19 |
| 6,244,323 | B1 * | 6/2001 | Miller | 156/763 |
| 6,442,304 | B1 | 8/2002 | Crawley et al. | |
| 6,607,608 | B1 * | 8/2003 | Vetrano et al. | 134/19 |
| 2008/0128084 | A1 * | 6/2008 | Dunwoody et al. | 156/344 |

FOREIGN PATENT DOCUMENTS

WO    0177714 A2    10/2001

OTHER PUBLICATIONS

Chinnock, E.L. et al., Preparation of Optical-Fiber Ends for Low-Loss Tape Splices, The Bell System Technical Journal, Article, Mar. 1975, 471-477 vol. 54, Issue 3, American Telephone and Telegraph Company, USA.

Gloge, D. et al., Optical Fiber End Preparation for Low-Loss Splices, Article, 1579-1588 Nov. 1973, vol. 52 No. 9, American Telephone and Telegraph Company, USA.

* cited by examiner

*Primary Examiner* — Nicole Blan
(74) *Attorney, Agent, or Firm* — Cantor Colburn LLP

(57) ABSTRACT

A method of removing a polymer material from an optical fiber assembly includes: disposing a liquid metallic material proximate to the polymer material, the polymer material being bonded to the optical fiber; heating the liquid metallic material to a temperature sufficient to burn the polymer material and de-bond the polymer material from a surface of the optical fiber; and removing the polymer material and liquid metal from the surface of the optical fiber.

12 Claims, 4 Drawing Sheets

US 8,557,052 B2

METHOD AND APPARATUS FOR STRIPPING OPTICAL FIBERS AND OPTICAL FIBER ASSEMBLIES

BACKGROUND

Optical fibers find use in a variety of applications. For example, in the drilling and completion industry, optical fibers are utilized to provide communication between components and to measure various conditions and component parameters in a downhole environment as well parameters of downhole components. Exemplary optical fiber sensors include temperature sensors and strain sensors, which can be used to monitor deformation in downhole components. In some applications, optical fibers are coated with protective layers and may also be bonded to substrates. Portions of an optical fiber coating and/or substrate bonding material may be removed, for example, so that the optical fiber can be terminated. The coating and/or bonding material may also be removed so that the optical fiber can be spliced or connected to another fiber, or connected to a signal source or detector.

Typical methods of stripping polymer coatings, such as polyimide, from optical fibers include either burning of the coating using an open flame, or dipping of the fiber into vials of heated acid. These methods pose potential problems by the nature of the chemicals used and fire hazards.

SUMMARY OF THE INVENTION

A method of removing a polymer material from an optical fiber assembly includes: disposing a liquid metallic material proximate to the polymer material, the polymer material being bonded to the optical fiber; heating the liquid metallic material to a temperature sufficient to burn the polymer material and de-bond the polymer material from a surface of the optical fiber; and removing the polymer material and liquid metal from the surface of the optical fiber.

An apparatus for removing a polymer material from an optical fiber assembly includes: a container including a liquid metallic material configured to receive an optical fiber, the optical fiber including a polymer material bonded thereto, the container configured to contact the liquid metallic material to the polymer material; and a heater configured to heat the liquid metallic material to a temperature sufficient to burn the polymer material and de-bond the polymer material from a surface of the optical fiber.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Described herein are methods and apparatuses for removing polymer materials from optical fibers and/or optical fiber assemblies such as fiber optic cables. An exemplary method includes contacting or otherwise applying a metallic liquid (e.g., gallinstan) to a polymer coating and/or adhesive, and heating the polymer coating to a temperature sufficient to burn or corrode the polymer coating and allow the polymer coating to be removed from the optical fiber and/or substrate. In one example, a length of a polymer coated optical fiber or fiber optic cable is immersed in a heated liquid metal, wherein the polymer material is burned and de-bonded from the optical fiber. The de-bonded polymer is then rinsed or cleaned off to expose the length of optical fiber.

Figure 1:
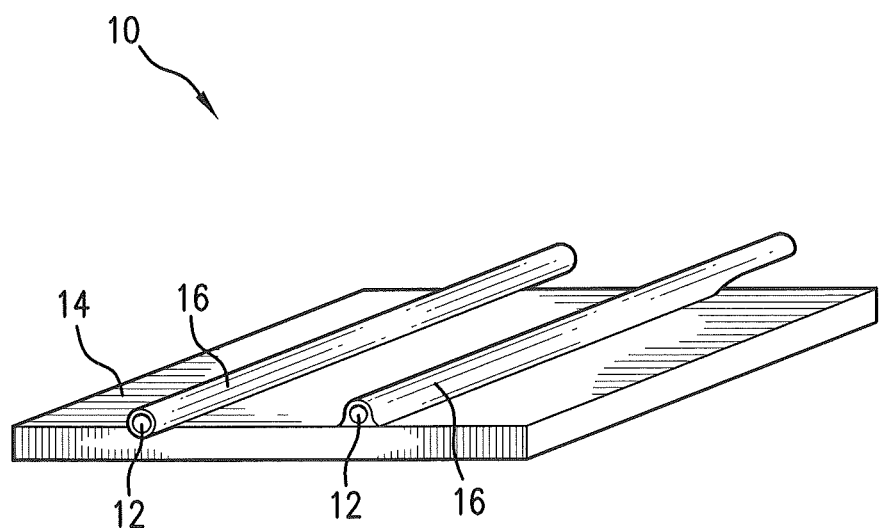
FIG. 1 is a perspective view of an embodiment of a fiber optic assembly including a polymer coated optical fiber adhered to a substrate.
Figure 2:
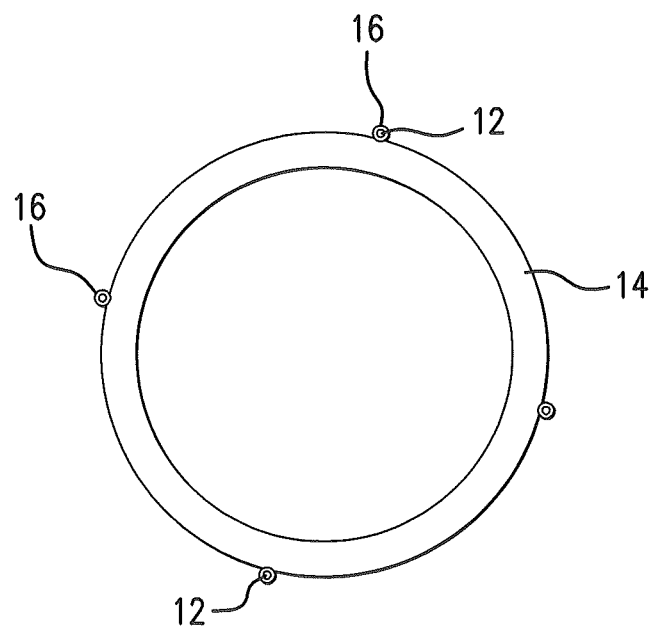
FIG. 2 is a cross-sectional view of another embodiment of the fiber optic assembly of FIG. 1.
Figure 3:
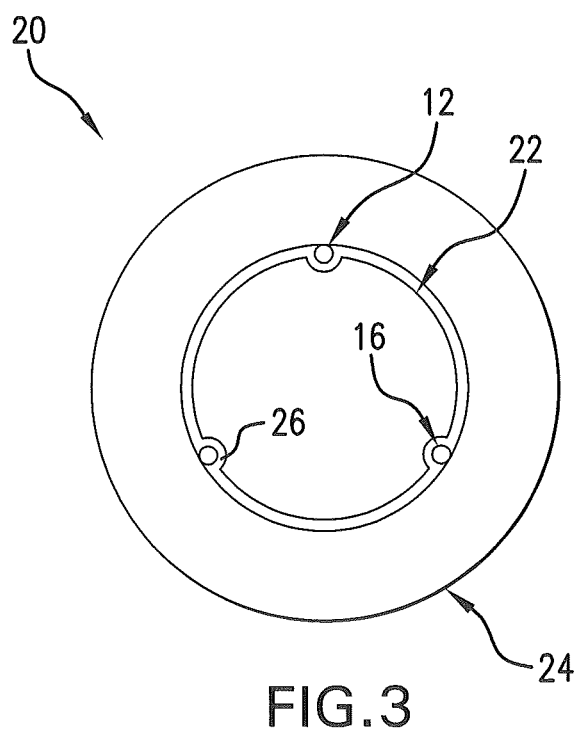
FIG. 3 is a cross-sectional view of a cable including a fiber optic assembly adhered to a cable member via a polymer material.

FIGS. 1-3 illustrate examples of fiber optic assemblies that include polymer materials (e.g., polyimide materials) that are configured as a coating around an optical fiber and/or an adhesive to bond the optical fiber to a substrate. Referring to FIG. 1, an exemplary fiber optic assembly 10 includes an optical fiber 12 that is adhered to at least a portion of a substrate 14. In one embodiment, the substrate is made from a metallic material such as stainless steel or aluminum. The optical fiber 12 has protective polymer material 16 that is bonded to the optical fiber 12 and is configured as a coating or outer layer. The polymer material 16 may also be bonded to the substrate 14 and thereby acts as an adhesive to secure the optical fiber 12 to the substrate 14. The optical fiber 12 may be bonded directly to the substrate 14 via the polymer coating 16 and/or via additional polymer material that is bonded to the coating and the substrate 14.

In one embodiment, optical fiber 12 is configured as an optical fiber sensor including a core having one or more measurement locations such as fiber Bragg gratings (FBG) located along the length of the optical fiber sensor 12. Other measurement units may include lengths or regions of the optical fiber sensor 12 utilized for the detection of intrinsic scattering such as Rayleigh, Raman or Brillouin scattering signals. The substrate 14 may be any member deformable by a force and/or pressure, and need not take the specific shapes and configurations described herein. The fiber optic assembly 10 in this embodiment is configured to estimate various parameters exerted at various locations on the substrate 14 and/or the fiber 12. Examples of such parameters include external and internal parameters such as strain, pressure and other forces.

In one embodiment, the optical fiber 12 is adhered to the substrate 14 via a polyimide material, which may include a polyimide coating or an additional layer of polyimide that is fused to the polyimide coating and adhered to the substrate 14. Exemplary polyimides include polyimides having a high glass transition temperature (Tg), such as a Tg greater than about 250 degrees C. In one embodiment, the polyimide materials have a Tg that is greater than temperatures found in a downhole environment. Examples of such polyimide materials include thermoplastic polyimides (TPI) such as polyetheretherketone (PEEK), and composite polyimide materials such as composite polyimide/acrylate materials.

The optical fiber 12 includes a core for transmission of optical signals, such as a silica core, and a cladding such as a doped silica cladding. In one embodiment, the polyimide coating is adhered directly to the exterior surface of the cladding. Thus, in this embodiment, the optical fiber 12 consists of only three layers, i.e., the core, the cladding and a polyimide material that acts as both a protective coating and an adhesive to secure the optical fiber 12 in a fixed position relative to the substrate 14.

FIG. 2 illustrates another example of the fiber optic assembly 10. In this embodiment, one or more optical fiber sensors 12 having a polymer coating material 16 are adhered via the polymer coating 16 to a tubular substrate 14. Examples of the tubular substrate include sections of a carrier such as a borehole string, drill string or production string configured to be disposed in a borehole in an earth formation.

Referring to FIG. 3, the fiber optic assembly 10, in one embodiment, is incorporated into a fiber optic cable 20. The cable 20 may be configured as a strain sensing cable that is disposed with a deformable component such as a borehole string or downhole tool to measure parameters such as strain and deformation of the component. Other parameters such as temperature and pressure may also be measured using the cable 20.

The cable 20 includes one or more optical fibers 12 disposed on and adhered to one or more metallic members, such as a central member or cable core 22. The optical fibers 12 are adhered via the polymer material 16 to a surface of the core 22. A protective outer cable wall 24 is disposed about the optical fibers 12 and the cable core 22.

In one embodiment, the cable core 22 includes passages or grooves 26 extending along the cable core 22 surface, for example, in an axial or helical path. The optical fibers 12 are disposed in and adhered to surfaces of the grooves 26 via their respective polyimide coatings. The cable core 22 may be a solid core or may be configured to accommodate additional cable components, such as additional core members, conductive wires and additional optical fibers. For example, the cable core 22 may have additional grooves or spaces disposed near its surface, or may be hollow to accommodate the additional components.

The components and configurations of the cables are not limited to the embodiments described herein. For example, the cable 20 may include other components such as additional electrical conductors for supplying power or communication. Furthermore, the type or configuration of the substrates is not limited. For example, all of the embodiments described herein can allow for the incorporation of additional optical fibers for other sensing technologies such as, but not limited to, distributed temperature sensing (DTS), acoustic sensing, and single point pressure/temperature sensing. The exemplary cables 20 described herein include multiple optical fibers 12, although the number and configurations of the optical fibers 12 are not so limited.

In one embodiment, the substrate 14 is includes as at least part of a component of a subterranean well drilling, evaluation, exploration and/or production system. The component may include a borehole string configured to be disposed in a borehole that penetrates an earth formation. The borehole string can include one or more pipe sections or coiled tubing that extend downward into the borehole. Other components may include a drill bit assembly, a bottomhole assembly (BHA), and downhole tools for various processes including drilling, hydrocarbon production, and formation evaluation (FE) for measuring one or more physical quantities in or around a borehole. The optical fiber 12 can be configured as a pressure, strain and/or force sensor, such as an optical fiber sensor and/or a strain sensing cable 20. The optical fiber 12 and/or cable 20 may also include capability for communicating between components and/or a surface processing unit.

Figure 4:
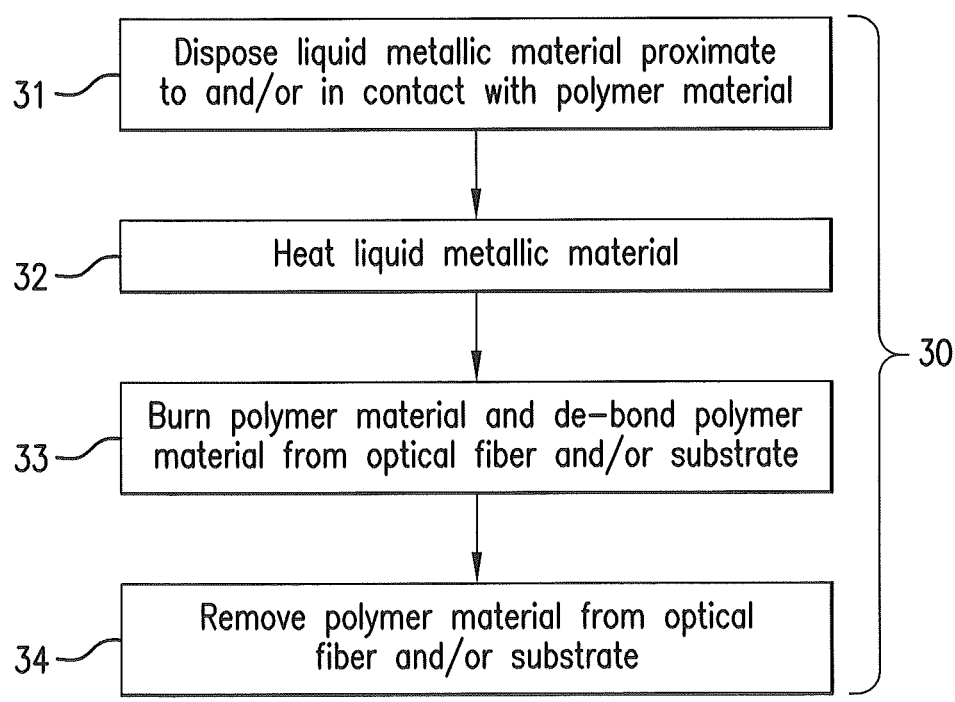
FIG. 4 is a flow chart illustrating an embodiment of a method of removing a polymer material from an optical fiber and/or substrate adhered to the optical fiber.

FIG. 4 illustrates a method 30 of removing a polymer material, such as a polymer coating and/or adhesive material, from an optical fiber. The method 30 includes one or more stages 31-34. Although the method 30 is described in conjunction with the optical fiber 12, the substrate 14 and/or components of the cable 20, the method 30 is not limited to use with these embodiments. In one embodiment, the method 30 includes the execution of all of stages 31-34 in the order described. However, certain stages may be omitted, stages may be added, or the order of the stages changed.

In the first stage 31, a liquid metallic material is applied to an optical fiber having a polymer coating and/or an optical fiber assembly including an optical fiber bonded to a substrate. For example, the liquid metallic material is disposed proximate to or contacted with a surface of the polymer coating (or adhesive polymer material) and/or a surface of the substrate. As referred to herein, an "optical fiber assembly" may include either at least one optical fiber having a polymer coating or a fiber optic assembly including at least one optical fiber adhered or bonded to a substrate.

The liquid metallic material includes any liquid conductive metallic material. In one embodiment, the metallic material is liquid at room temperature. On example of the liquid metallic material is gallinstan. Other examples include metals such as indium, gallium and mercury, and alloys of metals such as indium, gallium, tin and bismuth.

In one embodiment, the substrate includes a flat or relatively flat metal plate, and applying the liquid metallic material includes pouring the liquid metallic material over the length of the optical fiber that is to be removed. In one embodiment, the liquid metallic material is held in a container and the optical fiber or fiber optic assembly (e.g., optical fiber 12, fiber optic assembly 10 and/or cable 20) is dipped or otherwise inserted into the liquid metallic material.

In the second stage 32, the liquid metallic material is heated to a temperature sufficient to burn the polymer material and de-bond the polymer material from a surface of the optical fiber and/or the substrate. Heating may be performed by any suitable device or method, such as by contacting the substrate to a resistive heating element (either directly or indirectly via another metal). In one embodiment, heating is performed by applying an inductive heater to the liquid metallic material. For example, the liquid metallic material may be disposed in an inductive furnace or disposed in a heat resistant container and disposed within a conductive coil.

In the third stage 33, the liquid metallic material reaches the sufficient temperature and thereby heats the polymer material to the sufficient temperature. For example, the liquid metallic material is gallinstan, which is heated to a temperature at or above about 600 degrees C. The polymer material burns at this temperate and loses its bond with the optical fiber and/or substrate.

In the fourth stage 34, the de-bonded polymer material is removed from the optical fiber and/or substrate. This may be accomplished by any desired cleaning method, such as by rinsing with a suitable liquid or cleaning with alcohol. In one embodiment, the optical fiber, substrate and liquid metallic material is allowed to cool (e.g., to room temperature) prior to removing the polymer.

Figure 5:
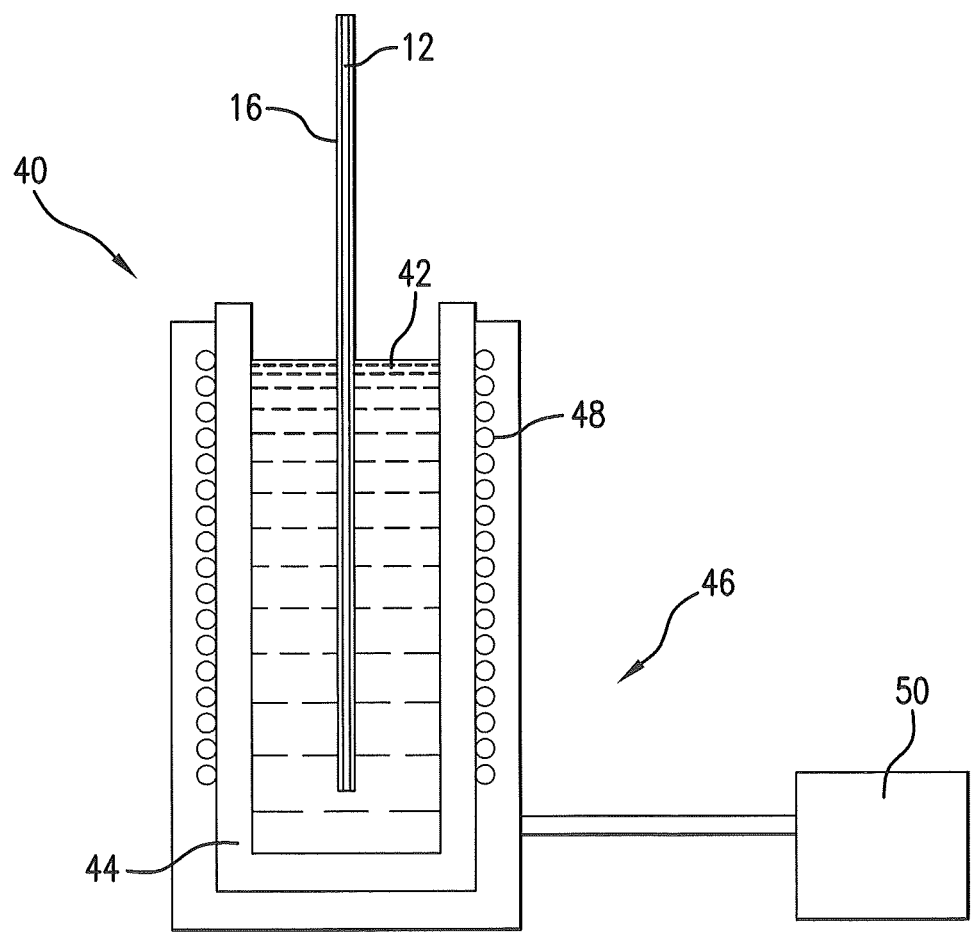
FIG. 5 is a cross-sectional view of an apparatus for removing a polymer material from an optical fiber and/or substrate adhered to the optical fiber.

FIG. 5 illustrates an exemplary apparatus 40 for removing polymer coatings and/or adhesives from optical fibers and fiber optic assemblies. Use of the apparatus 40 is described herein in conjunction with an optical fiber 12 having a polymer coating 16, however, the apparatus may be used with any fiber optic assembly having a polymer material, such as the fiber optic assembly 10 and the cable 20.

The apparatus 40 includes a liquid metallic material 42 disposed in a container 44. In one embodiment, the container 44 is disposed in an induction heater 46 including an electrically conductive coil 48 that is wrapped around the container 44. The coil 48 is electrically connected to a power source and/or controller 50 configured to apply a selected current to the coil 48. In other embodiments, the container 44 is a separate container, such as a heat resistant tube, that can be lowered into the coil 48.

In conjunction with the apparatus 40, the optical fiber 12 can be lowered into the liquid metallic material 42, which is heated to a temperature sufficient to burn the polymer coating 16 either prior to or after lowering the optical fiber 12. After the polymer material has burned and de-bonded from the optical fiber 12, the optical fiber 12 is removed and cleaned. In one embodiment, the optical fiber 12 is lowered or dipped into the liquid metallic material, removed, and then lowered into a space surrounded by the coil 48 for heating.

The apparatuses and methods described herein provide various advantages over existing methods and devices. For example, the methods described herein include using a liquid metallic material to burn the polymer coating (and/or adhesive) and remove that polymer coating. Such methods are safer than prior art methods as they do not involve the use of an open flame, and also do not involve the use of corrosive and potentially dangerous materials such as sulfuric acid.

In connection with the teachings herein, various analyses and/or analytical components may be used, including digital and/or analog systems. The apparatus may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

The invention claimed is:

1. A method of removing a polymer material from an optical fiber assembly comprising:
    disposing a liquid metallic material proximate to the polymer material, the polymer material being bonded to the optical fiber;
    heating the liquid metallic material to a temperature sufficient to burn the polymer material and de-bond the polymer material from a surface of the optical fiber; and
    removing the polymer material and liquid metal from the surface of the optical fiber.

2. The method of claim 1, wherein the liquid metallic material is an alloy including gallium, indium and tin.

3. The method of claim 1, wherein the liquid metallic material is selected from at least one of indium, gallium, mercury, and alloys including at least one of indium, gallium, tin and bismuth.

4. The method of claim 1, wherein the polymer material is a polyimide material.

5. The method of claim 1, wherein the polymer material is selected from at least one of an optical fiber coating and an adhesive material configured to adhere the optical fiber to a substrate.

6. The method of claim 5, wherein the substrate is a metallic component of a fiber optical cable.

7. The method of claim 5, wherein the substrate is a component configured to be disposed in a downhole location.

8. The method of claim 5, wherein disposing includes applying the liquid metallic material to a surface of the polymer material and a portion of a surface of the substrate.

9. The method of claim 8, wherein applying includes immersing a portion of the polymer material and the optical fiber into a container containing the liquid metallic material.

10. The method of claim 5, wherein the polymer material includes:
    a protective coating surrounding the optical fiber, the protective coating made from a polyimide material; and
    an adhesive configured to adhere the optical fiber to the substrate, the adhesive made from the polyimide material.

11. The method of claim 1, wherein heating includes disposing the liquid metallic material and the polymer in an induction heater.

12. The method of claim 1, wherein heating includes applying a heat source to a substrate on which the polymer material and the optical fiber are disposed.

* * * * *